United States Patent
Neuhof

[19]

[11] Patent Number: 6,106,181
[45] Date of Patent: Aug. 22, 2000

[54] CONTROL APPARATUS WITH CONTROL PANEL

[75] Inventor: Markus Neuhof, Ehringshausen-Niederlemp, Germany

[73] Assignee: Rittal-Werk Rudolf Loh GmbH & Co. KG, Herborn, Germany

[21] Appl. No.: 09/068,063

[22] PCT Filed: Dec. 20, 1996

[86] PCT No.: PCT/EP96/05790

§ 371 Date: Apr. 28, 1998

§ 102(e) Date: Apr. 28, 1998

[87] PCT Pub. No.: WO97/28586

PCT Pub. Date: Aug. 7, 1997

Related U.S. Application Data

[63] Continuation-in-part of application No. 08/930,804, Oct. 8, 1997.

[30] Foreign Application Priority Data

Jan. 29, 1996 [DE] Germany ........................... 196 03 097

[51] Int. Cl.⁷ ..................................................... F16C 11/00
[52] U.S. Cl. ............................... 403/84; 403/87; 403/97; 364/708.1; 361/681; 16/382; 16/330
[58] Field of Search .................................... 403/84, 87, 97, 403/93, 94, 103; 16/264, 254, 382, 330, 329; 361/680, 681, 686, 724, 732, 733, 752; 364/708

[56] References Cited

U.S. PATENT DOCUMENTS

| | | |
|---|---|---|
| 3,223,371 | 12/1965 | Miller ..................................... 403/97 X |
| 4,548,446 | 10/1985 | Warshawsky .......................... 403/97 X |
| 4,582,445 | 4/1986 | Warshawsky .............................. 403/97 |
| 4,628,567 | 12/1986 | Brockhaus et al. .................... 16/254 X |
| 4,730,364 | 3/1988 | Tat-Kee .............................. 364/708.1 X |
| 4,961,126 | 10/1990 | Suzuki ..................................... 361/398 |
| 5,021,763 | 6/1991 | Obear ................................ 364/708.1 X |
| 5,340,073 | 8/1994 | Masakazu ........................... 403/103 X |
| 5,498,165 | 3/1996 | Tseng ................................ 364/708.1 X |
| 5,564,852 | 10/1996 | Maxwell et al. ...................... 403/84 X |
| 5,566,048 | 10/1996 | Esterberg et al. ....................... 361/681 |
| 5,668,570 | 9/1997 | Ditzik ............................... 364/708.1 X |

FOREIGN PATENT DOCUMENTS

| | | |
|---|---|---|
| 0 419 698 A1 | 4/1991 | European Pat. Off. . |
| 0 432 967 A2 | 6/1991 | European Pat. Off. . |
| 3119209 A1 | 12/1982 | Germany . |
| 3612109A1 | 10/1987 | Germany . |
| 652 555 A5 | 11/1985 | Switzerland . |

OTHER PUBLICATIONS

Hewlett–Packard Journal, vol. 43, No. 5, Oct. 1, 1992, pp. 41–47, "Mechanical Design of the HP 4980, Network Advisor" by Krebs, K.R.

Rittal Handbuch 28—Umschalten auf Perfection.

*Primary Examiner*—Anthony Knight
*Assistant Examiner*—David E. Bochna
*Attorney, Agent, or Firm*—Jansson, Shupe, Bridge & Munger, Ltd.

[57] ABSTRACT

A connection device allows for mounting a control panel in a manner such that the panel projects from the front lower edge of a control apparatus. According to the invention, optimum adjustment of the control panel relative to the front of the control apparatus is achieved in that the connection devices take the form of angle plates which are assembled from two leg parts and can be set and secured in a plurality of angular positions about an axis aligned parallel with the lower edge of the control apparatus.

6 Claims, 4 Drawing Sheets

CONTROL APPARATUS WITH CONTROL PANEL

RELATED APPLICATIONS

This application is a continuation-in-part of co-pending application Ser. No. 08/930,804 filed on Oct. 8, 1997, titled APPARATUS FOR CONNECTING A CONTROL PANEL TO A CONTROL DEVICE, and relating to PCT International Application No. PCT/EP96/02757 having an international filing date of Jun. 5, 1996, and relating to the parent German application filed Jul. 15, 1995. This application also claims priority from PCT International Application No. PCT/EP96/05790 having an international filing date of Dec. 20, 1996 and based upon German application no. 196 03 097.8 filed in Germany on Jan. 29, 1996.

FIELD OF THE INVENTION

The invention relates to a connecting arrangement for connecting a control apparatus with a control panel.

BACKGROUND OF THE INVENTION

Solutions are known whereby the control apparatus and the control panel form a structural unit and therefore can only be utilized when together. Since the connecting arrangements are formed as one piece with the parts of the control apparatus and/or of the control panel, the upper side of the control panel always assumes the same angular setting with regard to the front side of the control device. With such connecting arrangements, if the control apparatus with the control panel is arranged at various heights, then the control panel cannot be optimally placed and operated.

OBJECTS OF THE INVENTION

An object of the invention is to provide a connecting arrangement for connecting a control apparatus with a control panel that overcomes some of the problems and shortcomings of the prior art.

Another object of the invention is to provide a connecting arrangement for connecting a control apparatus with a control panel whereby the control apparatus and the control panel form separate units, but can be connected to each other in a simple manner, providing the opportunity to adjust the control panel in a number of angular settings. How these and other objects are accomplished will become apparent from the following descriptions and from the drawings.

SUMMARY OF THE INVENTION

The connection of a control panel to a control apparatus is accomplished according to the invention in that the connecting arrangements are formed as angled pieces that each have a first and a second leg part. Such leg parts are joined together around a shaft that is oriented parallel to the lower edge of the control apparatus in such a manner as to allow the leg parts to be adjusted and fixed in a number of angular settings around the shaft.

By constructing the connecting arrangements as two angled pieces a simple connection is achieved between the control apparatus and the control panel. The angular position between the control apparatus and the control panel can easily be changed and fixed by means of the shaft. It is therefore possible to optimally adjust the control panel at various structural heights such that it is readily visible and operable.

In order to easily attach the connecting arrangement it is provided, according to one embodiment, that the free ends of the leg parts of the angle pieces be connected by means of frames that surround the front side of the control apparatus and the upper side of the control panel. A form-locking transition is thus ensured, in that the free ends of the leg parts are adapted to the contour of the frames.

In one embodiment of the inventions, the connections is characterized by the fact that the frames for the control apparatus and control panel are constructed of frame members and corner connectors. The corner connectors each have at least one screw receptacle, and the fastening screws are secured in the screw channels that are provided in the corner connectors. This allows the fastening screws to be lodged in a covered manner in the leg parts and the corner connectors. The frame members of the frame for the control apparatus and the control panel can be designed, as in the past, using extruded profile pieces, since only the facing corner connectors need to be fit and provided with screw channels.

In order to fix both swiveling leg parts of a connecting arrangement it is provided, according to one embodiment, that the ends of the leg parts of the angle pieces that face each other are formed as bearing flanges. Such bearing flanges are provided with a threaded bore or a receptacle for a connecting screw or a connecting lever.

This embodiment allows the adjustment of the angular setting to be undertaken in a stepped manner that can be arrested if the bearing flanges of the leg parts are provided with teeth that mate on the sides that face each other. In such embodiment, the teeth are arranged around the shaft (i.e., the threaded bore hole and the receptacle for the connecting screws or the connecting lever) and between the leg parts for step-wise changes in the angular setting.

A form locking connection and fixation is achieved in that the teeth and the gaps between the teeth of the annular teething are oriented radial to the shaft so as to widen in the outward direction. In this embodiment the two leg parts can be adjusted within a wide angular range.

The design of the connecting arrangement is such that the width of the leg parts (measured in the direction of the shaft) is a dimension that is equal to the dimension of the corner connector which is also equal to the width of the bearing flanges joined together. The portions of the leg parts that connect to the bearing flanges then themselves limit the angular range of the adjustment, since both leg parts of the connecting arrangement lie in one common swivel plane.

In yet another embodiment of the invention, the two angle pieces that are used are identical in construction. In such embodiment, one of the angle pieces is rotated so as to be 180 degrees out of phase from the first angle piece. The leg parts of both angle pieces are arranged such that the leg parts with the threaded bore holes lie on the sides facing each other, and the leg parts with the receptacles for the connecting screws or connecting lever lie on the outer sides that face away from each other. Because of this arrangement, only a few different parts are required and the attachment of the leg parts as well as the adjustment of the angular setting are simple to carry out, since the connecting screws are readily accessible.

For reasons of aesthetics and optimal performance another embodiment can be provided whereby the connecting screws are lodged in the leg part with countersunk screw heads, and the connecting screws are covered by means of a covering cap.

DETAILED DESCRIPTION OF PREFERRED EMBODIMENTS

Figure 1:
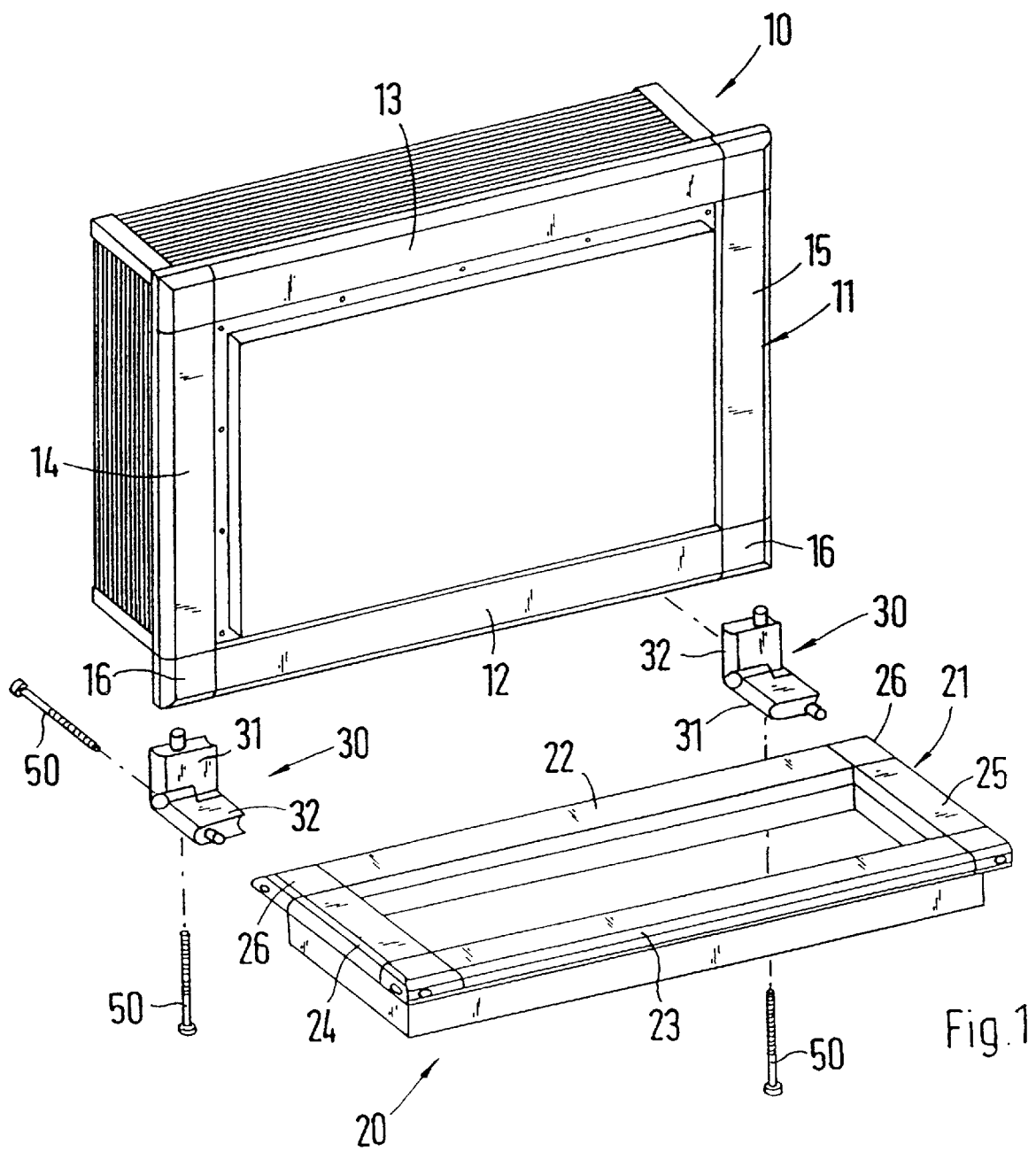
FIG. 1 is a perspective view of a control apparatus and a control panel showing the angle pieces that are part of the improved connecting arrangement.

In FIG. 1, none of the assembly parts of the control apparatus 10 and the control panel 20 are shown. Instead, only those parts are specified that are required for the connection of the control apparatus 10 and the control panel 20 according to the invention.

The front side of the control apparatus 10 in the exemplified embodiment is surrounded by a frame 11 that is comprised of frame members 12, 13, 14, 15 as well as corner connectors 16, one connector 16 at each of all corners. The remaining construction of the housing and the assembly of parts on the front side is not of importance here. The same is also true for the control panel 20 which is surrounded by a frame 21 on the upper side (operational side) composed of frame members 22, 23, 24 and 25 as well as corner connectors 26, one connector 26 at each of all corners.

In the preferred embodiment, two connecting arrangements 30 are provided for attaching the control panel 20 to the control apparatus 10, said connecting arrangements connecting the mutually facing frame members 12 and 22 of the frames 11 and 12 in the area of their connecting corner connectors 16 and 26. In a preferred embodiment, each of the connecting arrangements 30 has a width that corresponds to the facing dimension of each of the corner connectors 16 and 26 associated therewith. As is only indicated schematically in FIG. 1, the connecting arrangements 30 are angle pieces, each composed of two leg parts 31 and 32 which are screw-attached to corner connectors 16 and 26 by means of fastening screws 50, as is shown.

Both leg parts 31 and 32 of a connecting arrangement 30 are connected to each other in a manner which permits pivoting of one leg part, e.g., part 32, with respect to the other leg part, e.g., part 31. The parts 31, 32 are configured to pivot about an axis which, in a specific embodiment, extends parallel to the frame members 12 and 22 of the frames 11 and 21 of control apparatus 10 and control panel 20. After the connecting arrangements 30 are attached, the upper side of the control panel 20 (the side bounded by frame members 22, 23, 24, 25) can thereby be adjusted to assume, with respect to the front side of the control apparatus 10, any one of a number of angular positions. An advantage, now apparent after understanding the specification, is that the position and angle of the control panel 20 can be adjusted in recognition of ergonomics, i.e., of the user's stature and other physical characteristics, as well as to meet the preference of the user of such panel 20 and apparatus 10.

Figures 2, 3:
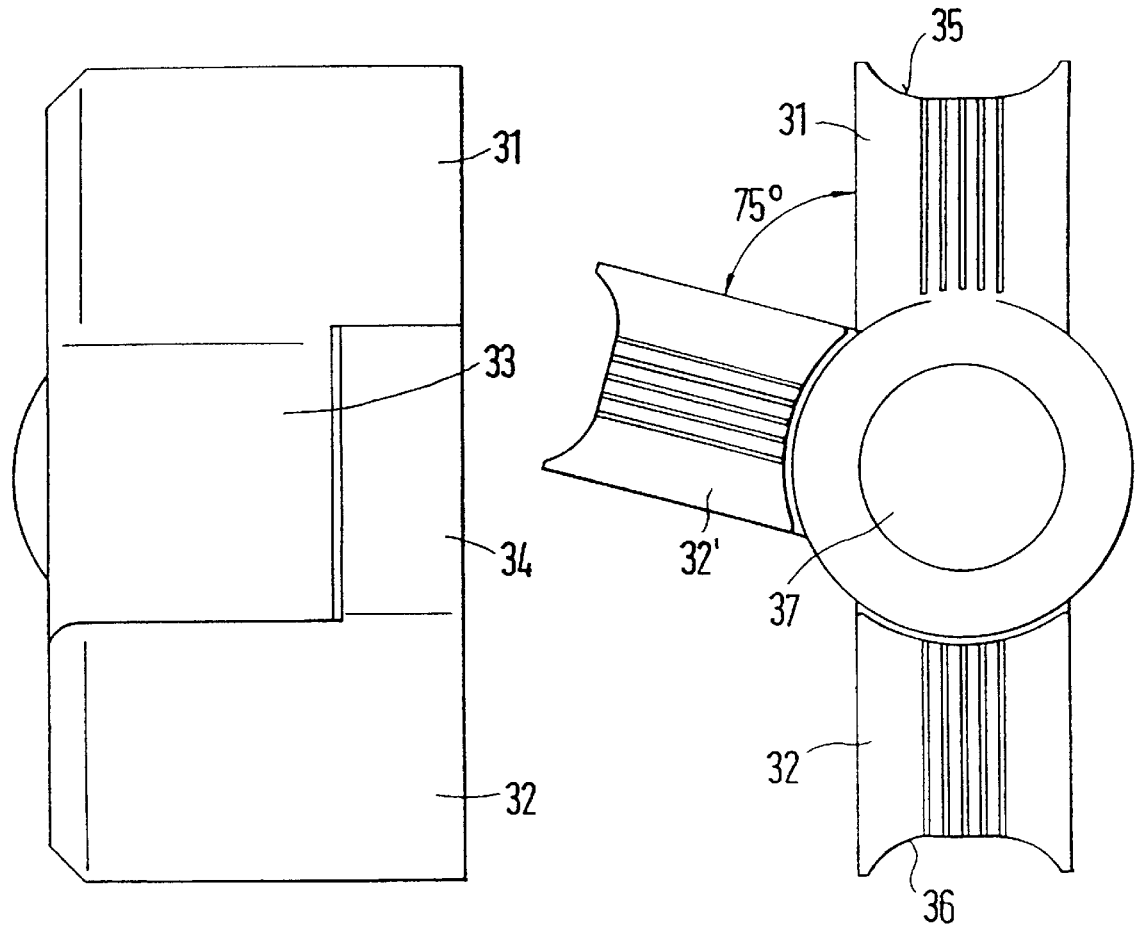
FIG. 2 is an enlarged front view of a two-part adjustable connecting arrangement.
FIG. 3 is the connecting arrangement of FIG. 2 shown in two angular positions.

As can be seen in FIGS. 2 and 3, the free ends 35 and 36 of leg parts 31 and 32 define respective surfaces that conform to the shape of the corresponding mating surfaces of the corner connectors 16 and 26. In a specific embodiment shown in FIG. 3, the surfaces (which may be said to be generally curved) have curved side portions spanned by a substantially planar portion. This feature permits a degree of "locking" between the ends 35, 36 and the corner connectors 16, 26, respectively.

The ends of the leg parts 31 and 32 that are adjacent to one another are embodied as bearing flanges 33 and 34. When the parts 31, 32 are joined together, the dimension across the flanges 33, 34, measured parallel to the shaft of the connecting screw 60, corresponds to the dimension of the leg parts 31 and 32 as well as to those of the corner connectors 16 and 26, also measured parallel to the shaft of the connecting screw 60. The leg parts 31 and 32 each include an abutment surface and such surfaces contact one another when the leg parts 31, 32 are at the minimum included angle, pivoted in either direction with respect to one another. In FIG. 3, an extreme position of leg part 32 with respect to part 31 is represented by position 32' at which the part 32 has been pivoted clockwise as viewed in that Figure. In a specific embodiment the minimum included angle is about 75°.

And it is to be appreciated that leg part 32 can also be pivoted counterclockwise with respect to part 31. To put it in other words, the leg part 32 can be pivoted approximately 105° in either direction from the position of FIG. 3 at which parts 31, 32 are coplanar with one another. With a total of about 210° of available movement, it is apparent that the user has a wide choice of positions for the control panel 20.

Figure 4:
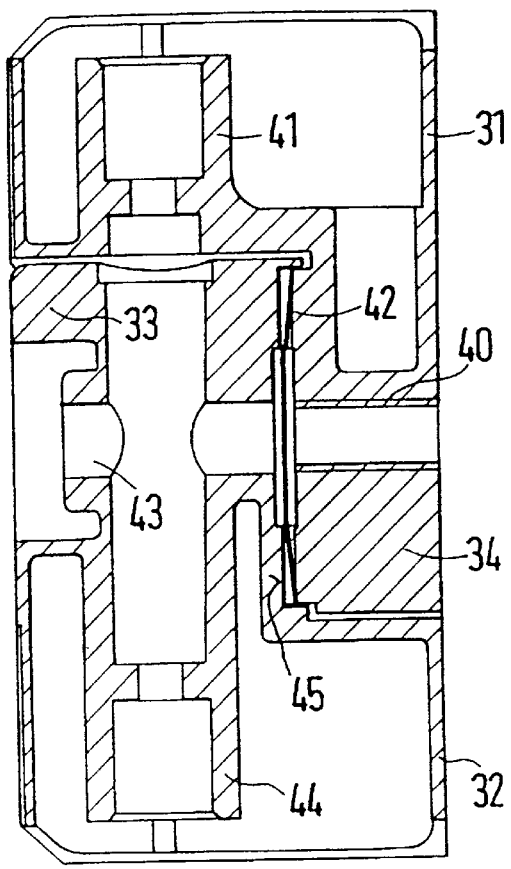
FIG. 4 is a sectional view taken through the left connecting arrangement shown in FIG. 1.
Figure 5:
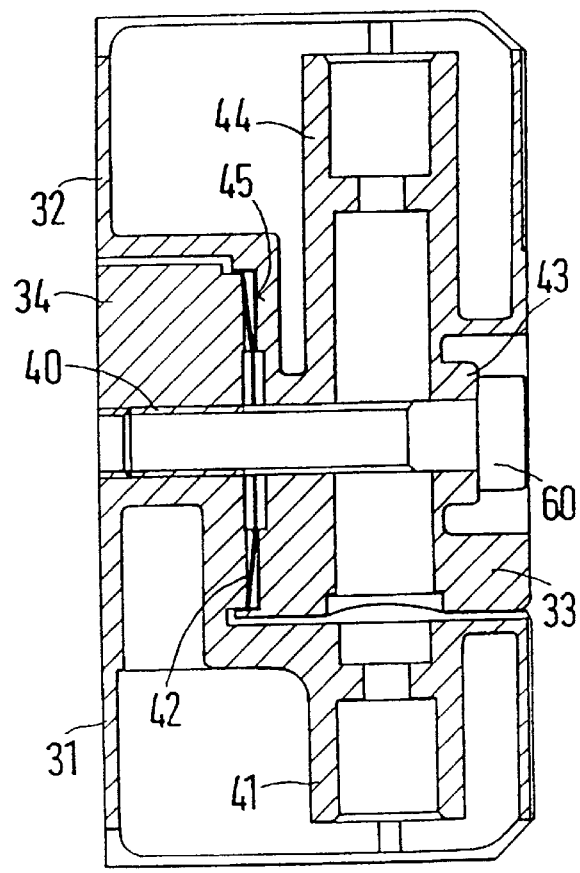
FIG. 5 is a sectional view taken through the right connecting arrangement shown in FIG. 1.
Figure 6:
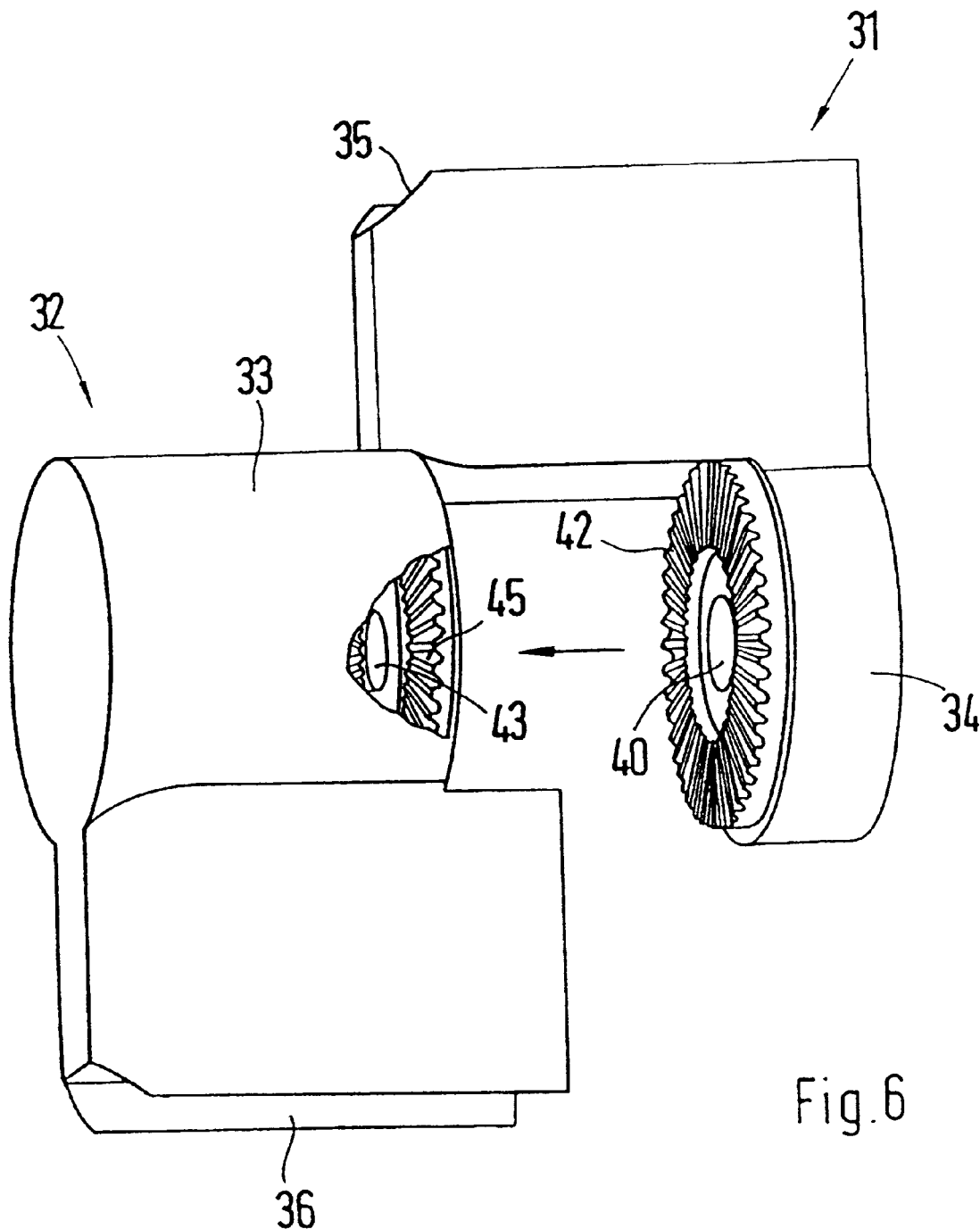
FIG. 6 is a perspective view showing the teeth and gaps on the two leg parts of an angle piece that forms part of the connecting arrangement.

Referring also to FIGS. 4, 5 and 6, the sides of the bearing flanges 33 and 34 that face each other (i.e., the sides that are generally perpendicular to the shaft of the screw 60) include teething 42 and 45 which define an annular ring around the shaft formed by the connecting screw 60. The teething 42, 45 each include a plurality of radially oriented teeth and gaps between the teeth. The teeth are spaced radially equidistant from one another as are the gaps. The arc widths of the teeth and of the gaps increase in the radially-outwardly direction. An advantage of this construction is that irrespective of the relative positions of the leg parts 31, 32 to one another, the connecting arrangements 30 are free of "play." That is, each tooth fits snugly into its opposing gap.

As is apparent from FIGS. 1, 4 and 5, both connecting arrangements 30 use identical leg parts 31 and 32. In the section views of FIGS. 4 and 5, the leg parts 31, 32 of one arrangement 30 are turned 180° from those of the other arrangement 30.

A threaded bore 40 is provided in bearing flange 34 of leg part 31 to receive the screw 60 that is guided in the thread-free receptacle 43 of the leg part 32. The radial spacing of the teeth forming teething 42 and 45 determine the minimum step-wise adjustable angular settings. In place of the connecting screws 60, other connecting elements such as connecting levers or the like can also be used.

When the leg parts 31, 32 of one arrangement 30 are turned 180° from those of the other arrangement 30 as described above, each of the connecting screws 60 is inserted from the outside inwardly. This configuration exposes the heads of such screws 60 for easy access; that is, neither of the heads of such screws 60 is between the arrangements 30. This makes the change in the angular setting between the control panel 20 and the control apparatus 10 easier. In such embodiment, the threaded bore 40, the receptacle 43 and the connecting screws 60 are parallel to the frame members 12 and 22 and coincident with and define the swivel axis.

For reasons of aesthetics and optimal performance, the connecting screws 60 are lodged in the leg part with countersunk screw heads, and the connecting screws 60 are covered by means of a covering cap 52.

Collets 41 and 44 which serve as receptacles for receiving the fastening screws 50 are integrally molded with the leg parts 31, 32 and extend along axes perpendicular to the swivel axis. The collets 41, 44 receive the fastening screws 50, with which the leg parts 31 and 32 are screwed to the corner connectors 16 or 26. The leg parts 31 and 32 can thereby be attached to the control apparatus 10 and the control panel 20 prior to connection to one another.

The perspective view according to FIG. 6 shows the spatial construction of a connecting arrangement 30. The bearing flanges 33 and 34 have essentially rounded cross sections with receptacle 43 and threaded bore 40 at their respective centers. Leg parts 31 and 32 in the area of the bearing flanges 33 and 34 are designed such that they do not impair any mutual rotation. FIG. 6 also shows that even though the bearing flanges 33, 34 have axial dimensions which differ from one another, the aggregate dimension of the bearing flanges 33 and 34 in the axial direction is equal to the width of leg parts 31 and 32. Such dimension is also equal to the dimension of the corner connectors 16 and 26.

What is claimed is:

1. In a connecting arrangement for attaching a control apparatus having a front panel with a control panel having an upper panel the improvement wherein:

the front panel of the control apparatus has an upper and a lower edge;

the connecting arrangement includes at least one angle piece;

the angle piece has a first leg part and a second leg part;

the first leg part and the second leg part are joined together around a shaft aligned parallel to the lower edge of the control apparatus in such a manner as to allow the leg parts to be adjusted and fixed in any one of a number of angular settings around the shaft;

each of the leg parts has a first, free end and a second end;

the free end of the first leg part is connected to the front panel of the control apparatus;

the free end of the second leg part is connected to the upper panel of the control panel;

the front panel of the control apparatus and the upper panel of the control panel are each surrounded by a contoured frame;

the free ends of the first and second leg parts are adapted to fit snugly with the contour of the frames;

the frames each have at least four frame members and four corner connectors;

the corner connectors each have at least one screw receptacle; and fastening screws are secured in the screw receptacles in the corner connectors.

2. In a connecting arrangement for attaching a control apparatus having a front panel with a control panel having an upper panel, the improvement wherein:

the front panel of the control apparatus has an upper and a lower edge;

the connecting arrangement includes at least one angle piece;

the angle piece has a first leg part and a second leg part;

the first leg part and the second leg part are joined together around a shaft aligned parallel to the lower edge of the control apparatus in such a manner as to allow the leg parts to be adjusted and fixed in any one of a number of angular settings around the shaft;

a second end of the first leg part is formed as a first bearing flange;

a second end of the second leg part is formed as a second bearing flange;

the first bearing flange and the second bearing flange are positioned so as to face opposite of each other;

the first bearing flange includes a threaded bore;

the second bearing flange has a connection receptacle; and a connecting screw passes through the connection receptacle and the threaded bore, thereby joining the first bearing flange with the second bearing flange.

3. The connecting arrangement of claim 2 wherein:

the first bearing flange has an inner side and an outer side;

the second bearing flange has an inner side and an outer side;

the inner side of the first bearing flange includes a series of teeth arranged around the threaded bore;

the inner side of the second bearing flange includes a series of teeth arranged around the connection receptacle; and the teeth on the first bearing flange mate with the teeth on the second bearing flange in such a manner as to allow for step-wise changes in the angular setting between the leg parts.

4. The connecting arrangement of claim 3 wherein:

gaps are located between the teeth; and the teeth and the gaps between the teeth are annularly formed and aligned radial to the shaft so as to widen in a radially-outward direction.

5. The connecting arrangement of claim 2 wherein:

the leg parts each have a first dimension in the direction of the shaft:

the corner connectors have a second dimension that corresponds to the first dimension of the leg parts; and the first bearing flange and the second bearing flange, joined together, have a third dimension in the direction of the shaft that corresponds to the first dimension of the leg parts.

6. The connecting arrangement of claim 2 wherein the connecting screw is lodged in the first leg part with countersunk screw heads and the connecting screw is covered by a covering cap.

* * * * *